United States Patent [19]
Wall et al.

[11] Patent Number: 4,551,752
[45] Date of Patent: Nov. 5, 1985

[54] METHOD AND APPARATUS FOR CORRECTING DISTORTION IN AN IMAGE WHICH IS RECORDED ELECTRONICALLY AND BUILT UP ALONG LINES

[75] Inventors: Lars E. Wall, Mölndal; John E. Jonsson, Mölnlycke, both of Sweden

[73] Assignee: Telefonaktiebolaget LM Ericsson, Stockholm, Sweden

[21] Appl. No.: 514,823

[86] PCT No.: PCT/SE 82/00365

§ 371 Date: Jun. 16, 1983

§ 102(e) Date: Jun. 16, 1983

[87] PCT Pub. No.: WO 83/01718

PCT Pub. Date: May 11, 1983

[22] PCT Filed: Nov. 2, 1982

[22] Filed: Jun. 16, 1983

[30] Foreign Application Priority Data

Nov. 10, 1981 [SE] Sweden ............... 8106650

[51] Int. Cl.⁴ .................. H04N 5/33; H04N 3/08
[52] U.S. Cl. .................. 358/113; 358/140; 358/160
[58] Field of Search .......... 358/113, 140, 160, 280, 358/180, 199; 355/52

[56] References Cited

U.S. PATENT DOCUMENTS

| | | | |
|---|---|---|---|
| 4,399,458 | 8/1983 | Berry | 358/113 |
| 4,402,009 | 8/1983 | Rathjens | 358/113 |
| 4,419,692 | 12/1983 | Modisette | 358/113 |

*Primary Examiner*—Howard W. Britton
*Attorney, Agent, or Firm*—Roberts, Spiecens & Cohen

[57] ABSTRACT

A method and a device for correcting distortion in an image recorded electronically and built up of picture elements along lines. The distortion arises due to the fact that in a field of view scanned along curved lines (31, 33, 35), the picture elements situated vertically below each other when represented on parallel straight lines are displaced horizontally relatively to each other. The picture elements obtained by scanning the field of view are stored in a memory (10) and fed out to a video screen (20). The picture elements on the representation line associated with the shortest scanning line are fed out unchanged while on lines corresponding to longer scanning lines additional picture elements are inserted at definite distance from each other. The distance is selected in such a manner that the number of inserted picture elements per line is proportional to the difference between the length of the respective line and the length of the shortest line (FIG. 5).

11 Claims, 9 Drawing Figures

METHOD AND APPARATUS FOR CORRECTING DISTORTION IN AN IMAGE WHICH IS RECORDED ELECTRONICALLY AND BUILT UP ALONG LINES

TECHNICAL FIELD

The present invention refers to a method to correct distortion in an image recorded electronically and built up of picture elements along lines, the distortion consisting therein that in a field of view scanned along lines, the picture elements situated vertically under each other will be displaced horizontally relative to each other when reproduced on parallel straight lines.

BACKGROUND ART

When producing an electronic image by scanning the field of view by, for example, infra-red detectors and converting the signals sensed by the detectors to electronic picture elements for reproduction on a video-screen, an inevitable distortion arises in certain types of scanning devices. This distortion occurs due to the fact that the scanning lines associated with a certain elevation are longer than scanning lines associated with a smaller elevation while the sampling frequency is the same. Consequently when the sensed picture elements are reproduced in a rectangular electronic picture on a video-screen, the picture points which in reality are situated above each other, will be displaced laterally, the points having smaller elevation lying nearer to the center of the picture than the points having greater elevation. Consequently vertical objects will be reproduced as inclined and in the case the picture is built up of a number of band-shaped partial pictures, a long vertical object will be reproduced as a number of inclined parts forming a saw-tooth profile. Such devices are previously known. See British Pat. Nos. 1,361,145 and 1,361,144, for example.

Theoretically it would be possible to solve the problem by supplying the picture elements on the different lines to the TV-monitor with different frequencies for each line. This is however difficult as it is difficult to obtain sufficiently constant and exact frequencies. Another possibility is to omit certain samples with definite serial number on the long lines. The drawback in this case is that information will be lost.

DISCLOSURE OF INVENTION

An object of the invention is to provide a solution of the above mentioned problems without having the drawbacks of the solution which are theoretically possible.

SUMMARY OF THE INVENTION

Briefly the invention contemplates correcting distortion in an image recorded electronically and built up of picture elements along lines, the distortion being that in a field of view scanned along lines, the picture elements situated vertically below each other will be mutually horizontally displaced when reproduced on parallel straight lines. The correction is accomplished by storing in a memory the picture elements arising by scanning the field of view. These stored elements are then supplied line for line to a picture screen, the picture elements associated with the shortest reproduction line being fed from the memory unchanged while into lines corresponding to longer scanning lines additional picture elements and parts of elements respectively are inserted at definite distance from each other. The distance is selected in such a manner that the number per line of inserted picture elements and parts of picture elements respectively is proportional to the difference between the length of the respective line and of the shortest line.

BRIEF DESCRIPTION OF DRAWINGS

The invention will be described more in detail by means of an embodiment with reference to the enclosed drawing in which FIGS. 4a–4d are diagrams which diagramatically show two scanning lines of different length and show different methods for compensating for the distortion occurring in the presentation.

MODE FOR CARRYING OUT THE INVENTION

Figure 1:
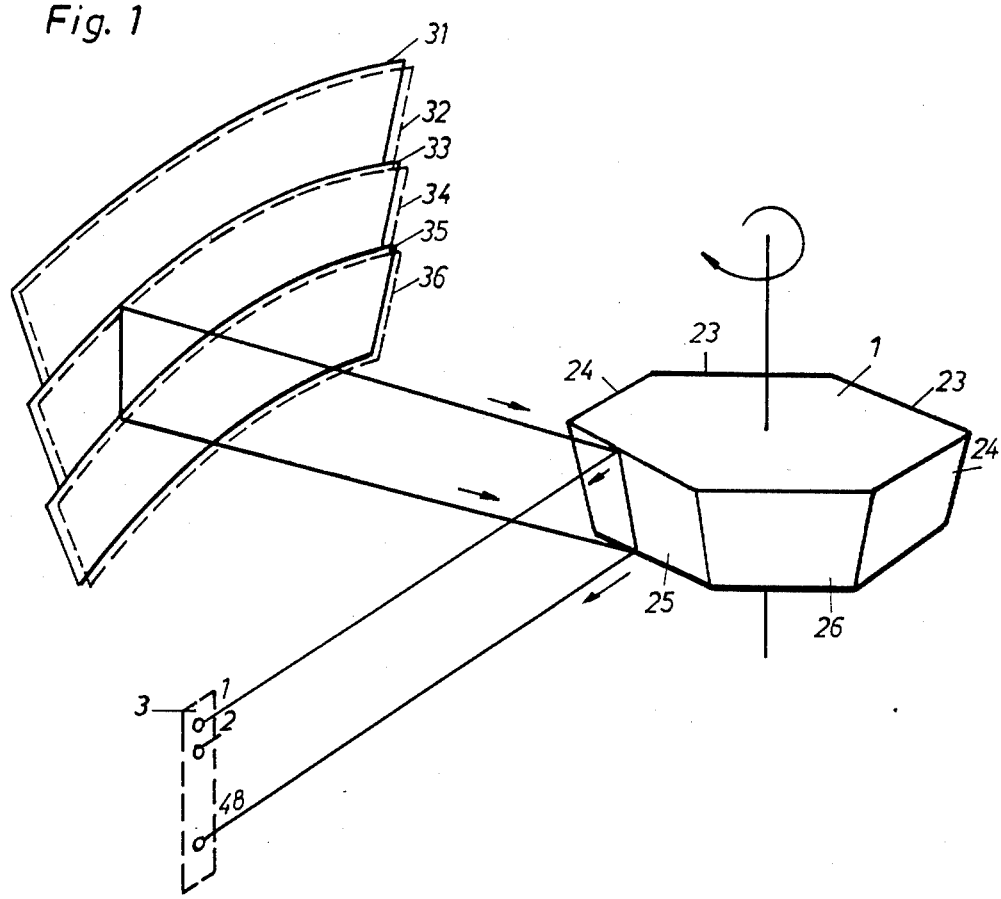
FIG. 1 shows diagramatically a scanning device comprising a rotating polygonal mirror.

FIG. 1 shows diagramatically a conventional infra-red (IR) scanning arrangement utilizing a rotating polygonal mirror 1. The mirror has six mirror surfaces 21–26 which are inclined relative to the vertical direction in such a manner that a light beam striking the mirror from the field of view is reflected to a detector device 3 having 48 detectors according to the present embodiment. The field of view is scanned by the rotation of the mirror in such a manner that picture elements (pixels) along 48 parallel curved lines are sensed simultaneously and the analog signals obtained are supplied to a memory after analog-digital conversion as will be explained later.

Figure 2:
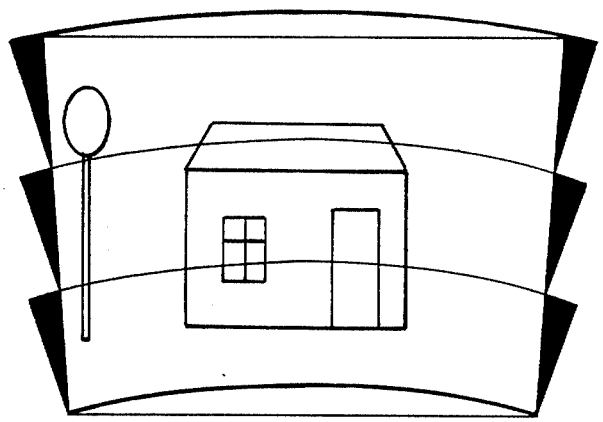
FIG. 2 shows the shape of a picture field which is sensed along parallel curved lines.

FIG. 2 shows diagramatically the scanning of a view, obtained when scanning with a rotating mirror of the above mentioned type along curved parallel lines and sensing the picture elements on all lines with the same sampling frequency. As appears the lines associated with a greater angle of elevation will be longer at the same time as their outer portions (the black areas) will be superfluos in a rectangular electronic picture. In scanning very often band shaped partial pictures are used which are obtained by means of a device according to FIG. 1.

The rotating polygonal mirror 1 has 6 mirror surfaces 21–26 the inclination of which varies with a definite angle in such a manner that 6 bands in the field of view can be scanned. According to the example the band 31 is scanned by the mirror surface 21, the band 33 by the mirror surface 22, the band 35 by the mirror surface 23 whereby a first half picture is obtained. Then the band 32 is scanned by the mirror surface 24, the band 34 by the mirror surface 25 and the band 36 by the mirror surface 26, whereby a second half picture is obtained which is interlaced with the first as appears from FIG. 3.

Figure 3:
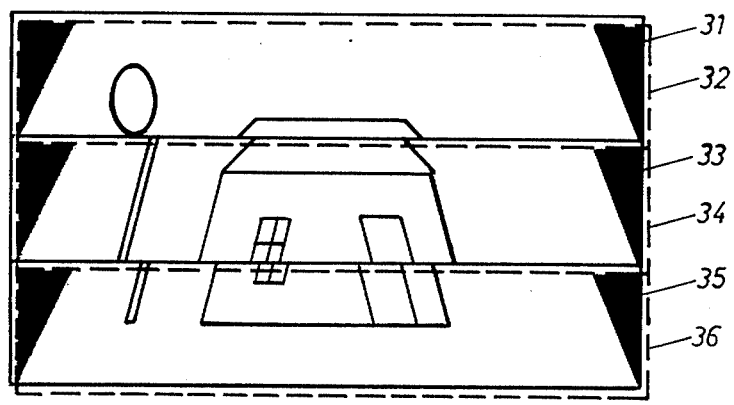
FIG. 3 shows the shape of the picture after having been represented in a video-screen.

FIG. 3 shows the picture arising when presenting the scanned view linearly. It appears that the longer the line in the field of view the more the line of the display is compressed besides the fact that picture points which originally are situated vertically above each other will be displaced laterally, long vertical lines will be interrupted at the limit between two bands so that a sawtooth line arises. If the shortest scanning line in a band has for example 550 picture points of the length X and the longest line 550 picture points of the length 1.1 X, the information in the longest line will be compressed in linear representation on a video-screen. Such compression causes the inclined lines, the inclination decreasing the nearer to the center of the picture the vertical line is situated.

Figures 4, 6:
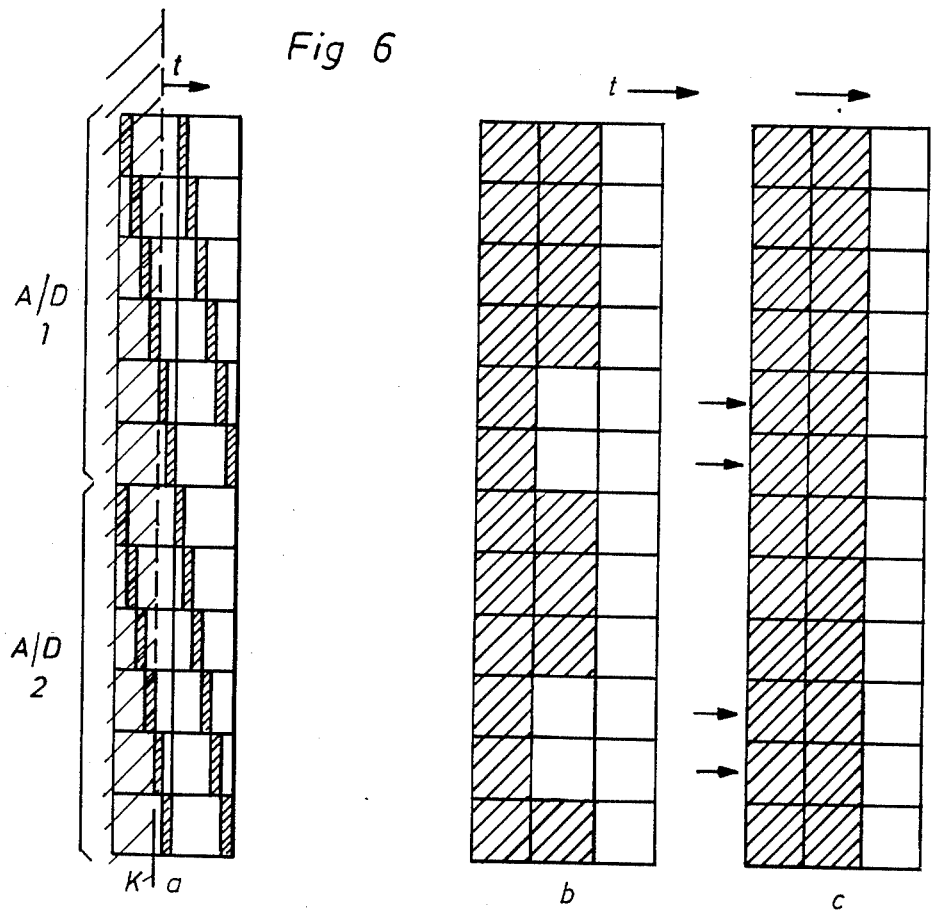

The fundamental idea of the invention is to compensate for the distortion by elongating the long scanning lines in linear representation by inserting picture signals between picture elements in definite positions and to achieve a picture in which the vertical straight lines are represented correctly. The diagram in FIG. 4 shows the principle. It is assumed that when scanning, line 48 is shorter than line 1 in such a manner that each picture element on line 1 has a length corresponding to 1.1 picture elements on line 48 (cf line a and b in FIG. 4). When presenting line 1 after each 10th picture element an interspace of the length of 1 picture element can be inserted (line c) or alternatively after each 5th picture element an interspace of the length of a half picture element can be inserted (line d) etc. The time between the beginning of two subsequent picture elements will be extended with a factor $$\left(1 + \frac{1}{n}\right)$$

where n is an integer equal or greater than 1. The less the line extension is, the less will be the non-linearity in the picture in consequence of the insertion of interspaces. The extension of such time must be carried out according to a definite pattern. If, for example, for line 1 an interspace of the length of 1 picture element is inserted for each 10th picture element (of the length of ½ picture element after each 10/2th picture element, of the length of ⅓ picture element after each 10/3th picture element etc) there is an interspace of 1 picture element for line 24 after each 20th picture element.

$$\left(2 \cdot \frac{10\text{th}}{2}, 2 \cdot \frac{10\text{th}}{3} \text{ etc.}\right).$$

For the lines where 48 cannot be divided by the serial number of a successive transition is applied. For line 2 the value $$10 \cdot \frac{48}{48 - 2} = 10.43$$

is obtained which results in that an insertion of an interspace is carried out three times after 10 picture elements and twice after 11 picture elements. The calculation is carried out for each line and the pattern obtained is used in a control device which carries out supplying of picture elements to a video-screen as will be explained in connection with FIG. 5. The insertion pattern varies corresponding to the characteristic values of the scanning device which values define the length of the scanning lines and consequently the distortion. The insertion frequency for a line having the serial number $m_n$ can be calculated according to the formula $$k \cdot \frac{m_o}{m_o - m_n}$$

where k is the number of picture elements between two insertions on the longest scanning line and $m_o$ is the serial number of the shortest line.

Figure 5:
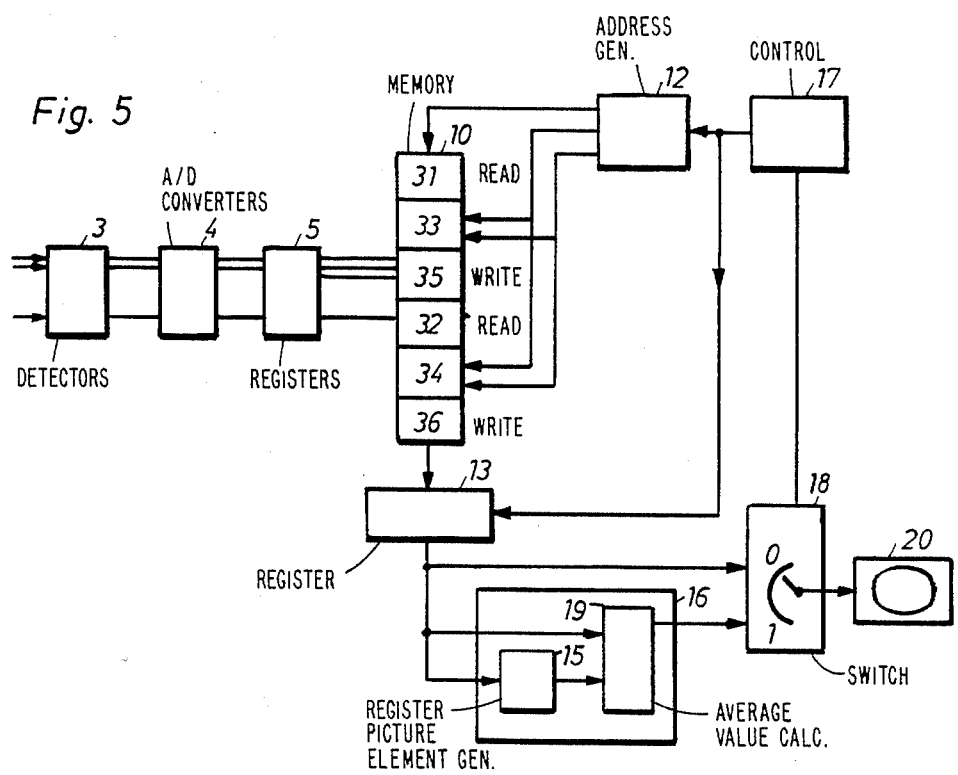
FIG. 5 shows diagramatically apparatus for carrying out the method according to the invention and FIG. 6 is a diagram showing that the invention also can be used for eliminating distortion which arises in electronic sensing because of phase shift.

FIG. 5 is a block diagram of exemplified apparatus for carrying out the method according to the invention. Block 3 is designated the detecting device including 48 IR detectors for sensing band shaped portions of the field of view along 48 lines. The sampling signals are converted to digital signals in the analog-digital converters 4 and through an input or write register register 5 are supplied to a memory 10 in which they are stored corresponding to the lines on which they will be read out to a video screen. The sampling signals are converted to digital words in order to define different levels of brightness but in order to simplify the description according to the example the analog-digital conversion results only in black or white picture elements, i.e., one bit per pixel.

As previously mentioned the field of view is divided into 6 bands which are scanned interlaced so that the bands 31,32,33 are sensed at first and the bands 32,34,36 afterwards, writing to the memory 10 and reading out of data of these two groups being carried out alternating with one another. Writing and reading out is controlled by an addressing circuit 12 which on one hand address the memory cells line for line and on the other hand activates control and read inputs respectively so that the picture elements are supplied to a read (output) register 13 from which they are supplied in series to a video signal line for transmission to a video screen. The arrangement includes a switch 18 which in one position allows the video signals to pass from the register 13 to the video screen while in its other position connects an additional picture signal to the line. The switching is carried out by a control device 17 which is stepped forward with the sampling velocity and has a memory adjusted corresponding to the pattern according to which additional picture signals will be inserted between the picture element signals. As previously mentioned this pattern is depending on the characteristics of the scanning device and with the values previously mentioned, on line number 47 an interspace with a picture signal will be inserted after each 480 sample while on line number 2 alternatingly 10 and 11 respectively. This is the case when the length of the interspace corresponds to complete picture elements. When the length corresponds to for example half picture elements the pattern has to be adjusted correspondingly.

When assuming for the sake of simplicity that the interspaces correspond complete picture elements, they are generated by a picture signal generator 16. One may select for these picture elements a luminance which best will merge into the picture for example an average value of the luminance of the adjacent picture elements. For this purpose the picture generator uses a register 15 which during a sampling period maintains the luminance value of each picture element and an average value calculator 19 which obtains a signal directly from the read register 13 and also a signal from the register 15 and carries out a calculation of the average value if the luminance value is expressed in for example 4-bit binary words. This average value is then supplied to the video signal line when the switch 18 is switched over to its other position. According to the simplified example hereabove with only black or white picture elements the luminance of the last picture element has been used for producing the additional picture signal. If a picture signal is inserted twice as often, a more even picture is obtained. This is carried out in such a manner that the picture elements are fed out from the register 13 with the double data velocity, each element twice and the generated average value signal with half picture element time is supplied to the video line while addressing and reading out is stopped. In an analogous manner an extension by for example 33% of the interspace between two picture elements can be inserted.

The invention permits conpensation for a further distortion arising in a scanning of the referred type due to the fact that, for the sake of economy, the number of analog-digital converters is less than the number of detectors, for example 8 converters for 48 detectors. Since the analog-digital converters operate so fast that they can sense the values of 6 detectors during the time of one picture element, it may occur that the condition of one or more detectors sensing an object having a vertical boundary (line k in FIG. 6a) has changed before the signals from all the 6 detectors have been transmitted by means of the analog-digital converter depending on the fact that during this time the boundary of the object has been seemingly moved horizontally. This may cause the vertical boundary to be represented as it would be toothed as for example only the first 4 detectors in each group of 6 detectors have had the time to sense the object (FIG. 6b). Such displacement which corresponds to at most 1 picture element can be compensated according to the invention by inserting for example in the last 2 lines of each 6-group of lines one picture signal corresponding to the length of a picture at the beginning of the lines marked by an arrow. In this case the control device 17 has to be adjusted, for example by changing the memory so that a switching over of the switch should be carried out also at the beginning of the last 2 lines in each group of 6 lines. In this way the toothed shape of the vertical edge lines will be eliminated (FIG. 6c).

When a single bit is used for each pixel the memory 10 can be a map of the viewing area, i.e., each of row of the memory corresponds to a viewing line while the cells along a row represent the pixels along a view line. Accordingly, the address generator can address the rows sequentially and while in a row address the cells sequentially therein. The read-write control is shifted from band to band. In order to generate half length picture elements the overall system clock would be used to control the insertion signals while, the clock divided by two would drive the address generator.

We claim:

1. A method of correcting distortion in an image recorded electronically and built up of picture elements along lines, the distortion consisting therein that in a field of view scanned along lines, the picture elements situated vertically below each other will be horizontally displaced relatively to each other when reproduced on parallel straight lines, the improvement comprising storing the picture elements arising by scanning the field of view are stored in a memory and controllably feeding the stored picture signals a picture screen, the control being in such manner that the picture signals associated with the shortest reproduction line contain the picture elements unchanged while in picture signals associated with longer scanning lines picture elements at definite distance from each other are fed out delayed with a time corresponding to a whole or part picture element, picture signals of corresponding length being generated and inserted in the arising interspaces, said definite interspaces being selected in such a manner that the number per line of interspaces is proportional to the difference between the length of the respective line and of the shortest line.

2. A method according to claim 1, characterized by that the interspaces have the same length which is obtained by scanning the field of view.

3. A method according to claim 1, characterized in that the interspaces have the length corresponding to the length of the picture elements obtained by scanning the field of view and divided by an integer.

4. A method according to claim 1, characterized in that the luminance of the inserted picture signals is defined by the luminance of adjacent picture elements.

5. A method according to claim 1, characterized in that at the beginning of at least one line in each group of lines, a picture signal having the length of a picture element is inserted in order to prevent a vertical line being represented as interrupted, due to the fact that when supplying the signals of the detectors associated with a vertical line after each other, at least one of the detectors has changed its condition before the signals of all detectors have been fed out.

6. A method according to claim 1, characterized in that the number of interspaces between two inserted picture elements for an arbitrary line with the serial number $m_n$ is calculated by means of the formula $$k \cdot \frac{m_o}{m_o - m_n}$$

where k is the number of picture elements between two interspaces on the longest line and $m_o$ is the serial number of the shortest line.

7. A method according to claim 6, characterized in that when the calculation results in a fraction for the number of interspaces between picture elements, the nearest integer is selected in suitable proportions in order to work only with integers.

8. An arrangement for correcting distortion in an image recorded electronically and built up of picture elements along lines comprising sensing means for sensing the field of view along parallel lines and generating electric signals corresponding to the sensed picture elements, memory means for storing the signals corresponding to the electronic picture which is to be represented on said picture screen, picture signal generating means, switch means which in one of its positions supplies picture signals stored in said memory means to said picture screen and in its other position supplies picture signals from said picture signal generator to said picture screen, a readout means, a control means for controlling according to a time pattern, on one hand said switch and on the other hand said read out means in such a manner that for signals associated with the shortest reproduction line said switch means is in one position in order to feed out picture signals unchanged, while for picture signals associated with longer lines the switch is switched to the other position in order to form at definite distances interspaces between picture elements at and feeding out picture signals during said interspaces, the number of switchings being proportional to the difference between the length of the respective line and the shortest line.

9. An arrangement according to claim 8, characterized in that the picture element generator comprises a register for storing at least one picture element and maintaining it during the subsequent picture element and an average value calculator means for generating a video signal, the luminance of which is the average of said two picture elements.

10. An arrangement according to claim 8, characterized in that said sensing means comprises a number of IR detectors, one for each scanning line and a number of analog-digital converters for converting the luminance value of the picture element to binary values for storing in the memory device.

11. An arrangement according to claim 10, characterized in that the number of analog-digital converters is less than the number of detectors so that a group of detectors is scanned by the same analog-digital converter sequentially said means inserting, at the beginning of at least one of the lines associated with the same detector group, a picture signal having the length of the picture element and parts of a picture element respectively in order to compensate a change of luminance which has occurred due to the fact that not all the detectors have been scanned simultaneously.

* * * * *